United States Patent Office 3,795,690
Patented Mar. 5, 1974

3,795,690
p-ALKYL - N - BIS(ALKYLXANTHYLALKYLENE)
AMINO-2,6-DINITROANILINE AND p-ALKYL-N-
HALOGENOALKYLENEAMINO, N - ALKYLXAN-
THYLALKYLENEAMINO - 2,6-DINITROANILINE
HERBICIDES
Donald W. Kaiser, New Haven, Conn., and Kenneth J. May, Weslaco, Tex., assignors to The Ansul Company, Marinette, Wis.
No Drawing. Continuation-in-part of abandoned application Ser. No. 877,508, Nov. 17, 1969. This application Nov. 10, 1971, Ser. No. 197,500
Int. Cl. C07c 154/02
U.S. Cl. 260—455 B                12 Claims

ABSTRACT OF THE DISCLOSURE

Novel-p-alkyl-N-bis(alkylxanthylalkylene)amino - 2,6-dinitroaniline and p-alkyl-N-halogenoalkyleneamino, N-alkylxanthylalkyleneamino-2,6-dinitroaniline derivatives are disclosed as well as their use as pre-emergent herbicides for the elimination of broadleaf weeds and grasses.

Cross-reference to related applications

This application is a continuation-in-part of U.S. Ser. No. 877,508, filed Nov. 17, 1969 now abandoned and assigned to The Ansul Company.

Background of the invention

This invention relates to novel compounds which are agriculturally useful. More particularly, this invention is concerned with novel p-alkyl-N-bis(alkylxanthylalkylene) amino-2,6-dinitroaniline and p-alkyl - N - halogenoalkyleneamino, N-alkylxanthylalkyleneamino - 2,6 - dinitroaniline derivatives and to a method for eliminating undesired broadleaf weeds and grasses by applying the aforesaid novel derivatives to an area infested with such weeds and grasses. More importantly, the herein disclosed preemergent herbicides are selective in that they destroy undesirable broadleaf weeds and grasses without affecting or injuring the plants or crops which are growing in the same area. For example, particular selectivity is found in cotton, soybeans and rice.

In agriculture, there is a continual and never-ending search for selective herbicides. Selectivity is an essential characteristic since one does not want to injure or affect the plants or crops growing simultaneously in the same area where the undesirable broadleaf weeds and grasses are found. For instance, the cultivation of cotton is a time-consuming and exacting process which is greatly hampered by weed growth. It would therefore be of great value to provide a pre-emergent herbicide which exhibits this selective ability.

Summary of the invention

Accordingly, this invention is concerned with novel compounds of the formulae:

(I)
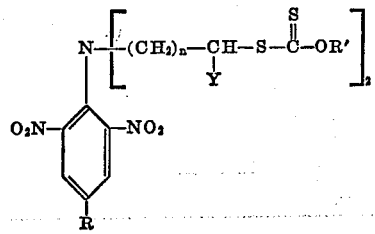

and (II)
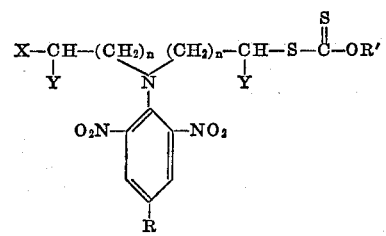

wherein R and R' are each alkyl containing from 1 to 4 carbon atoms; n is an integer from 1 to 3; X is halogen (F, Cl, Br, I) and Y is selected from the group consisting of H, alkyl containing from 1 to 4 carbon atoms and cyclohexyl.

Of special interest are compounds designated by the above formula wherein R is methyl, n is 2, Y is H and X is chloro such as N-bis(2-methylxanthylethyl)amino-2,6-dinitro-p-toluidine,
N-bis(2-ethylxanthylethyl)amino-2,6-dinitro-p-toluidine,
N-bis(2-propylxanthylethyl)amino-2,6-dinitro-p-toluidine,
N-bis(2-butylxanthylethyl)amino-2,6-dinitro-p-toluidine,
N-(2-chloroethyl)amino, N-(2-ethylxanthylethyl)amino-2,6-p-toluidine,
N-(2-chloroethyl)amino, N-(2-methylxanthylethyl) amino-2,6-p-toluidine,
N-(2-chloroethyl)amino, N-(2propylxanthylethyl)amino-2,6-p-toluidine,
N-(2-chloroethyl)amino, N-(2-butylxanthylethyl)amino-2,6-p-toluidine, Also included within the purview of this invention is the method of eliminating broadleaf weeds and grasses from an area without injuring the plants or crops thereon by applying an effective amount of the herein described novel herbicides.

Detailed description of the invention

The novel compounds of this invention can be prepared by adhering to the following schemes:

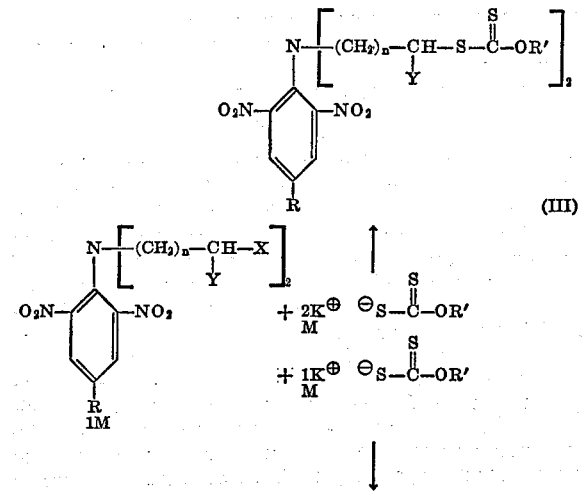

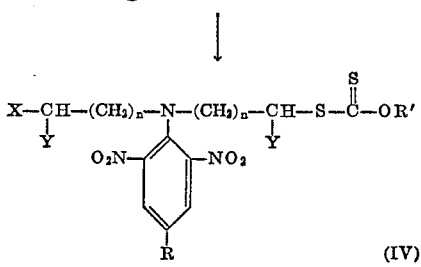

$$\text{(IV)}$$

wherein X is halogen (F, Cl, Br, I), R, R', Y and $n$ are as defined above. The reaction between a halide and a potassium or sodium alkyl xanthate is well-known and provides the expected xanthyl ester with the concurrent elimination of potassium or sodium halide. On a molewise basis, it is apparent that one requires 2 moles of xanthate per mole of halide in order to form the dixanthate (Reaction III). Even more preferred is a slight excess of xanthate to ensure completeness of that reaction.

However, if the monoxanthate (Reaction IV) is desired, one uses only one mole or slight excess of potassium or sodium alkyl xanthate per mole of halide. In this way, only one of the halogens on the halide reagent is displaced.

The halogen reagents are novel compounds disclosed and claimed in assignee's copending application filed Nov. 17, 1969, having Ser. No. 877,507 now U.S. Pat. 3,699,-197 and entitled Pre-Emergent Herbicides. The alkyl xanthates are either readily attainable by procedures well-documented in the literature or are commercially available. The reaction is generally carried out in a solvent such as water, at refluxing temperatures. However, it is possible and within the scope of this invention to use other suitable solvents such as alcohols or aqueous mixtures thereof. It is also possible, but less desirable, to carry out the reaction without a solvent in some cases.

A conventional work-up scheme applicable in the isolation and purification of the products of this invention is as follows: on completion of refluxing, the reaction mixture is poured into an excess of ice-water, extracted with an organic solvent such as chloroform, washed three times with water, separated, dried and optionally treated with charcoal. Evaporation of the resulting filtrate leads to a good yield of product which in most instances exists in oil form. In those instances where crystals form, recrystallization may be effected for further purification.

The herbicidal processes of this invention comprise applying a herbicidally effective amount of a compound disclosed herein to an area infested with seedling or germinating weed grasses, grass weed, or broadleaf weed seeds or broadleaf weeds either in the seedling or mature stage of growth. The compounds preferably are formulated for herbicidal use, either as sprays made up by adding water to emulsifiable concentrates or wettable powders, as granules or as dispersions on carriers such as attapulgite clay granules, peat moss, fertilizer, vermiculite, etc.

Since the compounds, as free bases are quite insoluble in water, surfactants are generally included in the preparation of the aforesaid emulsions or wettable powders. Suitable surfactants include polyoxyalkylene thioethers and anionic wetting agents such as alkyl aryl sulfonates. Other anionic surfactants giving particularly good results include sulfamides derived from N-methyltaurine or N-cyclohexyltaurine and fatty acids. The amount of wetting agent employed will vary from about 0.1 to about 5%, preferably 0.25 to 1.0% by weight of the total herbicidal solution or composition.

It is a considerable advantage of this invention that the p-alkyl-N-bis(alkylxanthylalkylene)amino - 2,6 - dinitroaniline and p-alkyl-N-halogenoalkyleneamino, N-alkyl-xanthylalkyleneamino-2,6-dinitroaniline derivatives as defined above do not affect the growth of crop plants in the pre-emergent stage of growth at concentrations which virtually eliminate germinating and seedling grasses and broadleaf weeds from an area infested therewith. Among the plants and crops which will tolerate effective concentrations of the herein disclosed compounds are cotton, soybean and rice.

The herbicidal compositions described herein will ordinarily be applied in a quantity at least about 1 lb. and preferably about 2 or between 2 and 10 lbs. of active herbicides per acre of cropland being treated.

The following examples are provided by way of illustration and should not be interpreted as limiting the invention, many variations of which are possible without departing from the spirit or scope thereof.

EXAMPLE I

N-bis(2-ethylxanthylethyl)-amino-2,6-dinitro-p-toluidine

A mixture of N-bis(2-chloroethyl)amino-2,6-dinitro-p-toluidine (36.0 g., 0.11 M), potassium ethyl xanthate (48.0 g., 0.30 M) and water (150 ml.) is stirred and refluxed for 6 hours. The mixture is then poured into ice-water, extracted with choloroform, washed 3 times with water, separated and the organic phase dried and treated with charcoal. The filtrate on evaporation provided a red oil product weighing 29.3 g. (54.8% yield).

EXAMPLE II

N-bis(2-methylxanthylethyl)amino-2,6-dinitro-p-toluidine

The procedure of Example I is repeated except an equivalent amount of potassium methyl xanthate is used in place of potassium ethyl xanthate with comparable results.

EXAMPLE III

N-bis(2-butylxanthylethyl)amino-2,6-dinitro-p-toluidine

The procedure of Example I is repeated except an equivalent amount of potassium butyl xanthate is used in place of potassium ethyl xanthate with comparable results.

EXAMPLE IV

N-bis(2-propylxanthylethyl)amino-2,6-dinitro-p-toluidine

The procedure of Example I is repeated except an equivalent amount of potassium n-propyl xanthate is used in place of potassium ethyl xanthate with comparable results.

EXAMPLE V

The procedure of Example I is repeated in preparing the following products wherein the following 2,6-dinitroaniline and xanthate derivatives are used, in equivalent amounts, instead of N-bis(2-chloroethyl)amino-2,6-dinitro-p-toluidine and potassium ethyl xanthate with comparable results:

| 2,6-dinitroaniline derivative | Xanthate derivative | Product |
| --- | --- | --- |
| N-bis(3-chloropropyl)-amino-2,6-dinitro-p-aniline. | Potassium methyl xanthate. | N-bis(3-methylxanthylpropyl)amino-2,6-dinitro-p-ethyl aniline. |
| N-bis(4-chlorobutyl)-amino-2,6-dinitro-p-n-propyl aniline. | Potassium n-propyl xanthate. | N-bis(4-n-propylxanthylbutyl)amino-2,6-dinitro-p-n-propyl aniline. |
| N-bis(4-chlorobutyl)-amino-2,6-dinitro-p-n-butyl aniline. | Potassium n-butyl xanthate. | N-bis(4-n-butylxanthylbutyl)amino-2,6-dinitro-p-n-butyl aniline. |
| N-bis(2-methyl-2-chloroethyl)-amino-2,6-dinitro-p-aniline. | Potassium methyl xanthate. | N-bis(2-methylxanthyl-2-methylethyl)amino-2,6-dinitro-p-aniline. |
| N-bis(2-ethyl-2-chloroethyl)-amino-2,6-dinitro-p-aniline. | -----do------- | N-bis(2-methylxanthyl-2-ethylethyl)amino-2,6-dinitro-p-aniline. |
| N-bis(2-n-butyl-2-chloroethyl)-amino-2,6-dinitro-p-aniline. | -----do------- | N-bis(2-methylxanthyl-2-n-butylethyl)amino-2,6-dinitro-p-aniline. |
| N-bis(2-n-propyl-2-chloroethyl)-amino-2,6-dinitro-p-aniline. | -----do------- | N-bis(2-methylxanthyl-2-n-propylethyl)amino-2,6-dinitro-p-aniline. |
| N-bis(2-cyclohexyl-2-chloroethyl)-amino-2,6-dinitro-p-aniline. | -----do------- | N-bis(2-methylxanthyl-2-cyclohexylethyl)amino-2,6-dinitro-p-aniline. |

EXAMPLE VI

One foot square flats 4 inches deep were filled with a sandy loam soil and seed of the following plant species were planted in rows: cotton (*Gossypium hirsutum* var. Stoneville 7A), soybeans (*Glycine max* var. Hardee), corn (*Zea mays*), Japanese millet (*Echinochloa crusgalli* vars. *frumentacea*), German Foxtail millet (*Setaria italica*), Ivyleaf morning glory (*Ipomoea hederacea*), and Redroot pigweed (*Amaranthus retroflexus*). The surface of soil covering the seed was then sprayed with aqueous solutions of N - bis(2-ethylxanthylethyl)amino-2,6-dinitro-p-toluidine rates equivalent to 4, 2, 1, and 0.5 lbs./acre. Immediately after spraying, the top ½ inch of soil was mixed thoroughly to insure that the chemical was mixed with the soil covering the seed.

The experiment was evaluated at 7 and 14 days after application. The results obtained indicate that the chemical is effective as an incorporated pre-emergent herbicide against all weed species tested. Cotton, corn and soybeans were not injured whereas all other plant species were killed or severely stunted.

EXAMPLE VII

The same procedure as described in Example VI is repeated except that the compounds described in Examples II, III, IV and V are tested in place of N-bis(2-ethylxanthylethyl)amino-2,6-dinitro-p-toluidine and substantially the same results are obtained.

EXAMPLE VIII

N-(2-chloroethyl)amino, N-(2-ethylxanthylethyl)amino-2,6-dinitro-p-toluidine

A mixture of N-bis(2-chloroethyl)amino-2,6-dinitro-p-toluidine (36.0 g., 0.11 M), potassium ethyl xanthate (17.7 g., 0.11 M) and water (150 ml.) is stirred and refluxed for 6 hours. The mixture is then poured into ice-water, extracted with chloroform, washed 3 times with water, separated and the organic phase dried and treated with charcoal. The filtrate on evaporation provides the desired product.

EXAMPLE IX

N-(2-chloroethyl)amino, N-(2-methylxanthylethyl)amino-2,6-dinitro-p-toluidine

The procedure of Example VIII is repeated except an equivalent amount of potassium methyl xanthate is used in place of potassium ethyl xanthate with comparable results.

EXAMPLE X

N-(2-chloroethyl)amino, N-(2-butylxanthylethyl)amino-2,6-dinitro-p-toluidine

The procedure of Example VIII is repeated except an equivalent amount of potassium butyl xanthate is used in place of potassium ethyl xanthate with comparable results.

EXAMPLE XI

N-(2-chloroethyl)amino, N-(2-propylxanthylethyl)amino-2,6-dinitro-p-toluidine

The procedure of Example VIII is repeated except an equivalent amount of potassium n-propyl xanthate is used in place of potassium ethyl xanthate with comparable results.

EXAMPLE XII

The procedure of Example VIII is repeated in preparing the following products wherein the following 2,6-dinitroaniline and xanthate derivatives are used, in equivalent amounts, instead of N-bis(2-chloroethyl)amino-2,6-dinitro-p-toluidine and potassium ethyl xanthate with comparable results:

| 2,6-dinitroaniline derivative | Xanthate derivative | Product |
|---|---|---|
| N-bis(3-chloropropyl)-amino-2,6-dinitro-p-aniline. | Potassium methyl xanthate. | N-(3-chloropropyl)amino, N-(3-methylxanthylpropyl)amino-2,6-dinitro-p-ethyl aniline. |
| N-bis(4-fluorobutyl)amino-2,6-dinitro-p-n-propyl aniline. | Potassium n-propyl xanthate. | N-(4-fluorobutyl)amino, N-(4-n-propylxanthylbutyl)amino-2,6-dinitro-p-n-propyl aniline. |
| N-bis(4-bromobutyl)-amino-2,6-dinitro-p-n-butyl aniline. | Potassium n-butyl xanthate. | N-(4-bromobutyl)amino, N-(4-n-butylxanthylbutyl)amino-2,6-dinitro-p-n-butyl aniline. |
| N-bis(2-methyl-2-chloroethyl)-amino-2,6-dinitro-p-aniline. | Potassium methyl xanthate. | N-(2-methyl-2-chloroethyl)amino, N-(2-methylxanthyl-2-methylethyl)amino-2,6-dinitro-aniline. |
| N-bis(2-ethyl-2-iodoethyl)amino-2,6-dinitro-p-aniline. | ---do--- | N-(2-ethyl-2-iodoethyl)amino, N-(2-methylxanthyl-2-ethylethyl)amino-2,6-dinitro-p-aniline. |
| N-bis(2-n-butyl-2-chloroethyl)-amino-2,6-dinitro-p-aniline. | ---do--- | N-(2-n-butyl-2-chloroethyl)amino-N-(2-methylxanthyl-2-n-butylethyl)amino-2,6-dinitro-p-aniline. |
| N-bis(2-n-propyl-2-chloroethyl)-amino-2,6-dinitro-p-aniline. | ---do--- | N-(2-n-propyl-2-chloroethyl)amino, N-(2-methylxanthyl-2-n-propylethyl)amino-2,6-dinitro-p-aniline. |
| N-bis(2-cyclohexyl-2-chloroethyl)-amino-2,6-dinitro-p-aniline. | ---do--- | N-(2-cyclohexyl-2-chloroethyl)amino, N-(2-methylxanthyl-2-cyclohexylethyl)amino-2,6-dinitro-p-aniline. |

EXAMPLE XIII

The same procedure as described in Example VI is repeated except that the compounds described in Examples VIII–XII are tested in place of N-bis(2-ethylxanthylethyl)amino-2,6-dinitro-p-toluidine and similar results are obtained.

What is claimed is:
1. A compound of the formula:

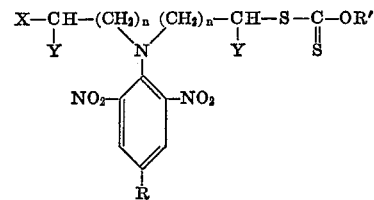

wherein R and R' are each alkyl containing from 1 to 4 carbon atoms; $n$ is an integer from 1 to 3, X is halogen (F, Cl, Br, I) and Y is selected from the group consisting of H, alkyl containing 1 to 4 carbon atoms and cyclohexyl.

2. A compound as claimed in claim 1 wherein R is methyl, $n$ is 2, X is chloro and Y is H.
3. A compound as claimed in claim 2 wherein R' is methyl.
4. A compound as claimed in claim 2 wherein R' is ethyl.
5. A compound as claimed in claim 2 wherein R' is propyl.
6. A compound as claimed in claim 2 wherein R' is butyl.
7. A compound of the formula:

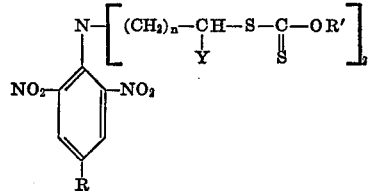

wherein R and R' are each alkyl containing from 1 to 4 carbon atoms; n is an integer from 1 to 3; and Y is selected from the group consisting of H, alkyl containing 1 to 4 carbon atoms and cyclohexyl.

8. A compound as claimed in claim 7 wherein R is methyl, n is 2 and Y is H.

9. A compound as claimed in claim 8 wherein R' is methyl.

10. A compound as claimed in claim 8 wherein R' is ethyl.

11. A compound as claimed in claim 8 wherein R' is propyl.

12. A compound as claimed in claim 8 wherein R' is butyl.

References Cited

UNITED STATES PATENTS

| | | | |
|---|---|---|---|
| 3,672,864 | 6/1972 | Maravetz | 71—121 |
| 3,238,035 | 3/1966 | Fischer et al. | 71—121 |
| 3,518,076 | 6/1970 | Wright | 71—121 |
| 2,861,913 | 11/1958 | Wegler et al. | 260—455 B |
| 3,419,620 | 12/1968 | Becher et al. | 71—121 |

OTHER REFERENCES

Everett et al., "Aryl-2-Halogenoalkylamines," J. Chem. Soc. (1949), pp. 1972–83.

GLENNON H. HOLLRAH, Primary Examiner

U.S. Cl. X.R.

260—577; 71—101